(12) United States Patent
Bogner et al.

(10) Patent No.: US 10,694,682 B2
(45) Date of Patent: Jun. 30, 2020

(54) SYSTEM AND METHOD FOR PROVIDING CARBON DIOXIDE AND CIRCULATING AIR FOR A VERTICAL GARDENING SYSTEM

(71) Applicant: Vertical Air Solutions LLC, Watsonville, CA (US)

(72) Inventors: Matthew L Bogner, Watsonville, CA (US); James C Cunningham, Aptos, CA (US)

(73) Assignee: Vertical Air Solutions LLC, Aptos, CA (US)

(*) Notice: Subject to any disclaimer, the term of this patent is extended or adjusted under 35 U.S.C. 154(b) by 220 days.

(21) Appl. No.: 15/730,659

(22) Filed: Oct. 11, 2017

(65) Prior Publication Data

US 2019/0059241 A1    Feb. 28, 2019

Related U.S. Application Data

(60) Provisional application No. 62/549,919, filed on Aug. 24, 2017.

(51) Int. Cl.
| | | |
|---|---|---|
| A01G 9/24 | (2006.01) |
| A01G 9/18 | (2006.01) |
| A01G 9/26 | (2006.01) |
| A01G 9/20 | (2006.01) |

(52) U.S. Cl.
CPC ............ *A01G 9/24* (2013.01); *A01G 9/18* (2013.01); *A01G 9/246* (2013.01); *A01G 9/26* (2013.01); *A01G 9/20* (2013.01)

(58) Field of Classification Search
CPC . A01G 9/18; A01G 9/24; A01G 9/241; A01G 9/246; A01G 9/249; A01G 9/26; A01G 7/045

USPC ............ 47/17, 19.2, 29.5, 39; 454/234, 241
See application file for complete search history.

(56) References Cited

U.S. PATENT DOCUMENTS

| | | | | |
|---|---|---|---|---|
| 3,307,469 A * | 3/1967 | Bohanon | ............ | F24F 7/013 |
| | | | | 454/228 |
| 3,348,922 A | 10/1967 | Bose et al. | | |
| 3,474,720 A * | 10/1969 | Sartain | ............ | A01G 9/246 |
| | | | | 454/236 |
| 3,810,327 A * | 5/1974 | Giansante | ............ | A01G 18/60 |
| | | | | 47/1.1 |
| 3,956,852 A * | 5/1976 | Ceausescu | ............ | A01G 9/246 |
| | | | | 47/17 |
| 4,292,762 A | 10/1981 | Fogg et al. | | |
| 4,505,066 A * | 3/1985 | Moore | ............ | A01G 9/14 |
| | | | | 47/17 |
| 5,358,444 A | 10/1994 | Helm et al. | | |
| 5,493,808 A * | 2/1996 | Munday | ............ | A01G 9/246 |
| | | | | 47/60 |
| 6,205,704 B1 * | 3/2001 | Schmitz | ............ | A01G 9/18 |
| | | | | 47/17 |

(Continued)

FOREIGN PATENT DOCUMENTS

| | | |
|---|---|---|
| JP | 2009-273481 A | 11/2009 |
| JP | 2014-014285 A | 1/2014 |

(Continued)

*Primary Examiner* — David J Parsley
*Assistant Examiner* — Danielle A Clerkley
(74) *Attorney, Agent, or Firm* — Levine Bagade Han LLP (57) ABSTRACT

Vertical growing uses a plurality of shelves to support plants. The system provides nitrogen and light to help grow the plants placed on the shelves. The system also circulates air that is filtered and mixed with the nitrogen before being distributed to the plants. The filters can remove odors from the circulating air.

18 Claims, 8 Drawing Sheets

(56) References Cited

U.S. PATENT DOCUMENTS

| | | | |
|---|---|---|---|
| 6,578,319 B1* | 6/2003 | Cole | A01G 31/02 47/17 |
| 8,468,741 B2* | 6/2013 | Lewis | A01G 31/06 47/66.6 |
| 9,161,498 B1* | 10/2015 | Shelor | A01G 9/18 |
| 9,241,453 B1* | 1/2016 | Martin | A01G 31/02 |
| 9,480,207 B2* | 11/2016 | Tanase | A01G 7/045 |
| 2004/0194371 A1* | 10/2004 | Kinnis | A01G 9/246 47/17 |
| 2004/0251122 A1* | 12/2004 | Goswami | A61L 2/02 204/157.3 |
| 2008/0086981 A1 | 4/2008 | Kilkis et al. | |
| 2008/0172935 A1* | 7/2008 | Feng | A01G 9/22 47/17 |
| 2010/0126063 A1* | 5/2010 | Emoto | A01G 7/045 47/39 |
| 2010/0275512 A1* | 11/2010 | Nien | A01G 9/16 47/66.7 |
| 2011/0192082 A1* | 8/2011 | Uchiyama | A01G 9/24 47/66.6 |
| 2011/0302838 A1* | 12/2011 | Chen | A01G 7/045 47/65.9 |
| 2012/0311926 A1* | 12/2012 | Mittelmark | F24F 3/16 47/17 |
| 2013/0000185 A1 | 1/2013 | Tanase et al. | |
| 2013/0305601 A1* | 11/2013 | Park | A01G 31/04 47/17 |
| 2014/0260131 A1 | 9/2014 | Burkhauser | |
| 2015/0007495 A1* | 1/2015 | Tseng | A01G 9/18 47/17 |
| 2015/0230416 A1 | 8/2015 | Lo | |
| 2016/0007544 A1 | 1/2016 | Takashima et al. | |
| 2016/0057944 A1 | 3/2016 | Smits et al. | |
| 2016/0242372 A1* | 8/2016 | Wong | A01G 7/045 |
| 2016/0324089 A1* | 11/2016 | Miyabe | A01C 21/005 |
| 2018/0125016 A1* | 5/2018 | Dufresne | A01G 9/246 |
| 2019/0059242 A1 | 2/2019 | Bogner et al. | |

FOREIGN PATENT DOCUMENTS

| | | |
|---|---|---|
| JP | 2016-208948 | 12/2016 |
| WO | WO 2019/040863 | 2/2019 |

\* cited by examiner

SYSTEM AND METHOD FOR PROVIDING CARBON DIOXIDE AND CIRCULATING AIR FOR A VERTICAL GARDENING SYSTEM

CROSS REFERENCE TO RELATED APPLICATION

This application claims priority to US Provisional Patent Application No. 62/549,919, "System And Method For Providing Carbon Dioxide And Circulating Air For A Vertical Gardening System" filed Aug. 24, 2017, the contents of which are hereby incorporated by reference.

BACKGROUND

Vertical farming is the practice of producing food and medicine in vertically, stacked layers, vertically inclined surfaces and/or integrated in other structures such as warehouses and other structures that can accommodate growing plants. Vertical farming use indoor farming techniques and controlled-environment agriculture (CEA) technology, where all environmental factors can be controlled. These facilities utilize artificial control of light and watering. Prior methods for circulating air are accomplishing using wall mounted oscillating fans and ceiling mounted HVAC systems. However, this air circulation method is ineffective in a vertical growing configuration and most vertical gardens are too compact for these environmental control methods to be efficient.

Prior methods for carbon dioxide dispersion use piping a plastic line to the back of a wall mounted fan or a carbon dioxide generator mounted at the ceiling in the room. Both methods do not allow for a controlled direction of carbon dioxide. Prior methods of filtering air have been through large "can filters" attached to a fan on the intake side. However, these large can filters occupy a large volume of space. What is needed is system which improves the circulation of air, improves the distribution of carbon dioxide, and uses smaller filters that occupy less space.

SUMMARY OF THE INVENTION

The present invention is directed towards a system and method for circulating air and carbon dioxide and providing light to a vertical gardening system. Traditional methods of wall mounted fans do not properly circulate air. The present invention eliminates the problem of stagnant air pockets created in indoor vertical farming where space is limited. The present invention also disburses carbon dioxide directly onto each row of crops growing on a different shelf of a rack assembly. This process insures that each plant receives an equal quantity of carbon dioxide, as opposed to common methods of releasing carbon dioxide into a large general area with non-uniform distribution. The invention also provides a compact air filtration system, eliminating the need for large can filters commonly used.

The new invention differs from traditional methods by having the filters on the supply side of an air circulation system. This allows for the air coming out of the fan to be disrupted, eliminating the spiral motion and pressurizes the low profile duct evenly on either side. The inventive system creates air movement inside each rack of plants where wall fans can't reach and space does not allow for. The new invention allows carbon dioxide to be plumbed into the plenum and dispersed directly to the plants. The new invention utilizes fan or fans with a filter to clean the air as well as circulating the air. This allows for less space to be used, lower energy costs, and the benefit of being able to change disposable filters more often at a much lower cost than "can filters".

DETAILED DESCRIPTION

The inventive system can be used with a vertical plant growing system to disperse carbon dioxide gas to a plurality of stacked shelves that are arranged vertically in a rack placed in a room or a building. A carbon dioxide distribution system can be mounted over each shelf of the rack so several carbon dioxide distribution systems can be used with each rack. The carbon dioxide distribution system can perform various functions including: circulate air around each of the plants, provides an even distribution of carbon dioxide to each of the plants and filters the recirculating air. A lighting system can also be attached to the bottom of the carbon dioxide distribution system that can provide continuous grow light exposure to the plants.

Figure 1:
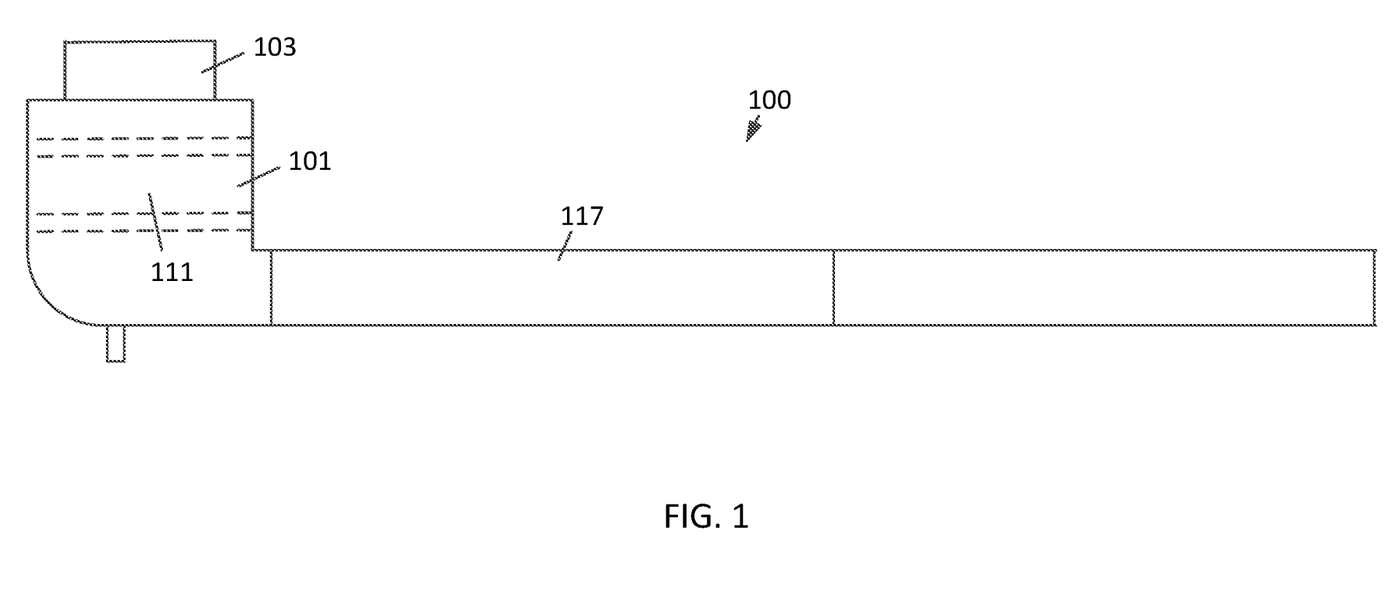
FIG. 1 illustrates is a side view of an embodiment of the carbon dioxide distribution system.
Figure 2:
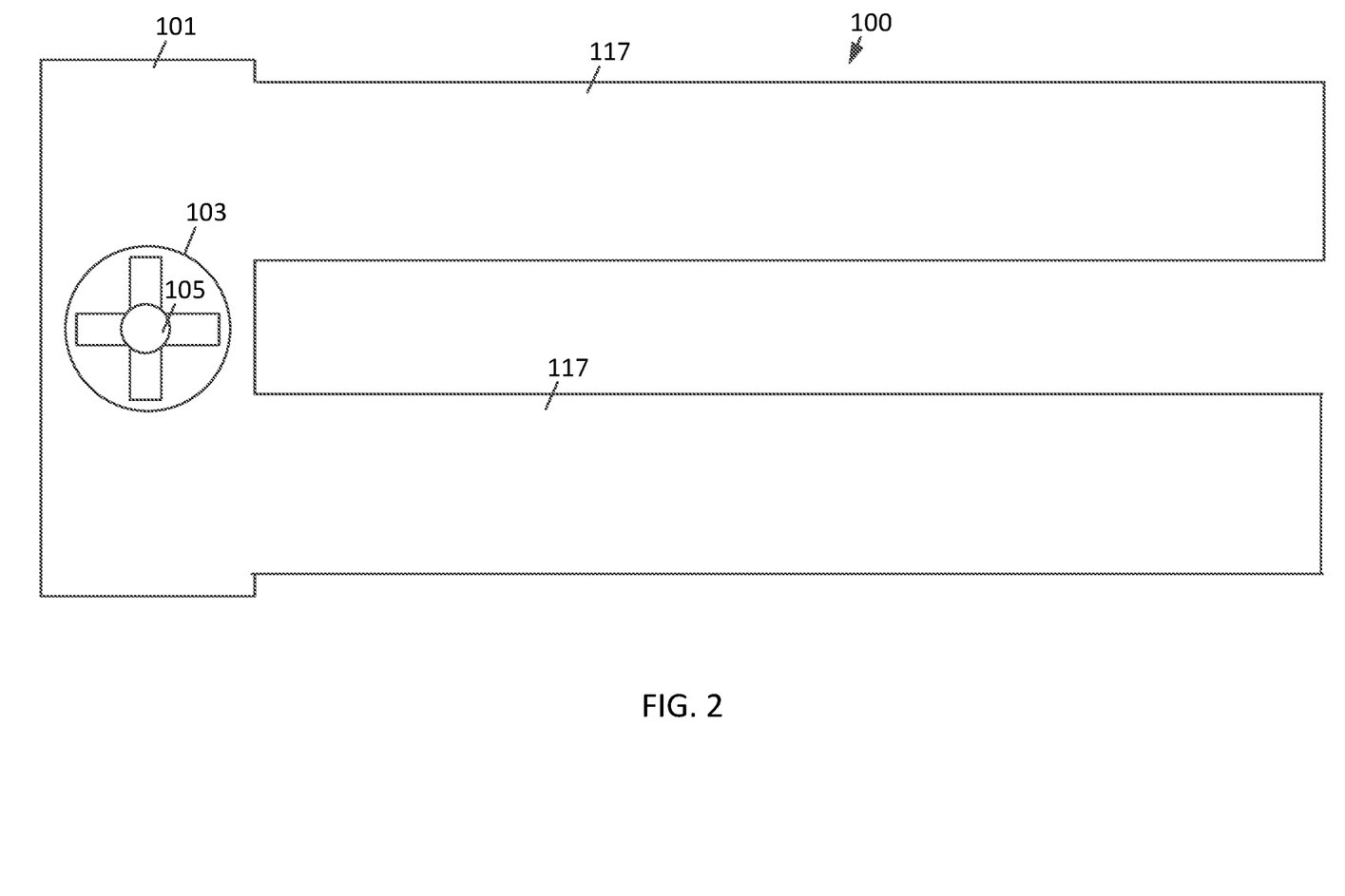
FIG. 2 illustrates a top view of an embodiment of the carbon dioxide distribution system.

With reference to FIG. 1, a side view of an embodiment of the carbon dioxide distribution system 100 is illustrated and with reference to FIG. 2, a top view of an embodiment of the carbon dioxide distribution system 100 is illustrated. Air can be directed into an intake collar 103 mounted on an inlet portion of a filter housing 101. In an embodiment, a fan 105 can be used to push the air into the intake collar 103. The air can enter the filter housing 101 and flow through one or more filters 111. The filtered air can then flow into a plenum. A carbon dioxide gas inlet 113 can be coupled to the plenum and the carbon dioxide can be mixed with the filtered air. The carbon dioxide and air mixture can then flow into one or more elongated ducts 117. Each duct 117 has a plurality of holes on a lower surface and the end of the duct 117 can be sealed with an end cap. The elongated ducts 117 are positioned above a plurality of plants on each shelf of the rack assembly. The carbon dioxide and air flow through the holes onto the plants, which absorb the carbon dioxide.

With reference to FIG. 2, in an embodiment, the fan 105 can be a 10" or a 6" to 14" inline fan 105 that can be mounted in the intake collar 103 at the top of the filter housing 101. The inventive system can be used with various types of vertical rack systems with plants positioned on each shelf of the rack system. The fan 105 can be mounted outside of the pallet rack volume on an end of the pallet rack. In an embodiment, the fan 105 flow rate can output 1,000 cubic feet per minute (CFM). In other embodiments, any other airflow mechanism can be used with the carbon dioxide distribution system to drive air through the system.

Figure 3:
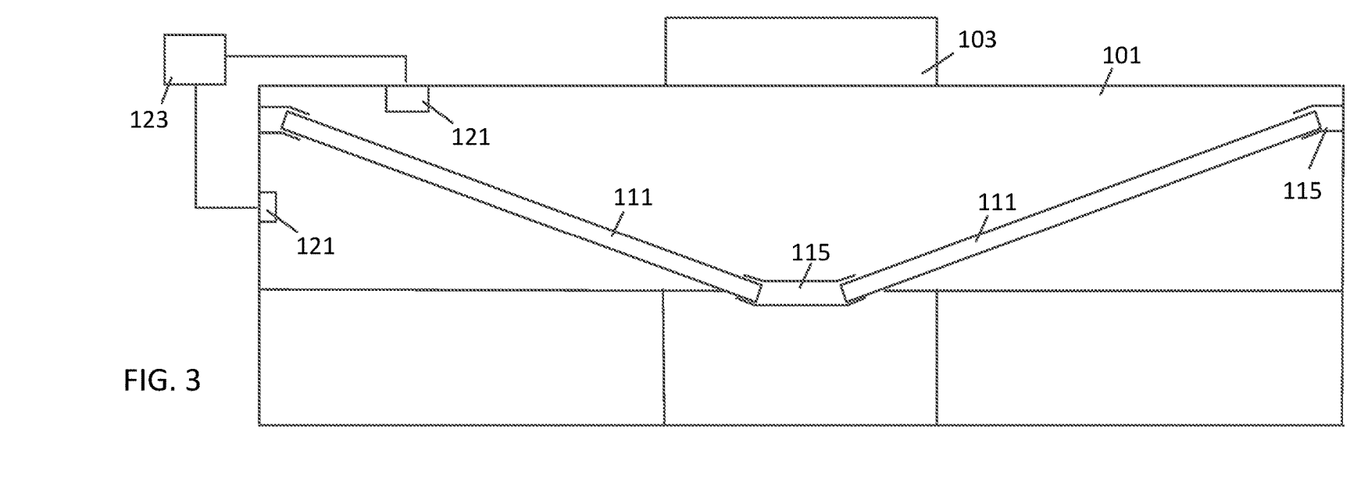
FIG. 3 illustrates a front section view of an embodiment of the air intake portion of the carbon dioxide distribution system.
Figure 4:
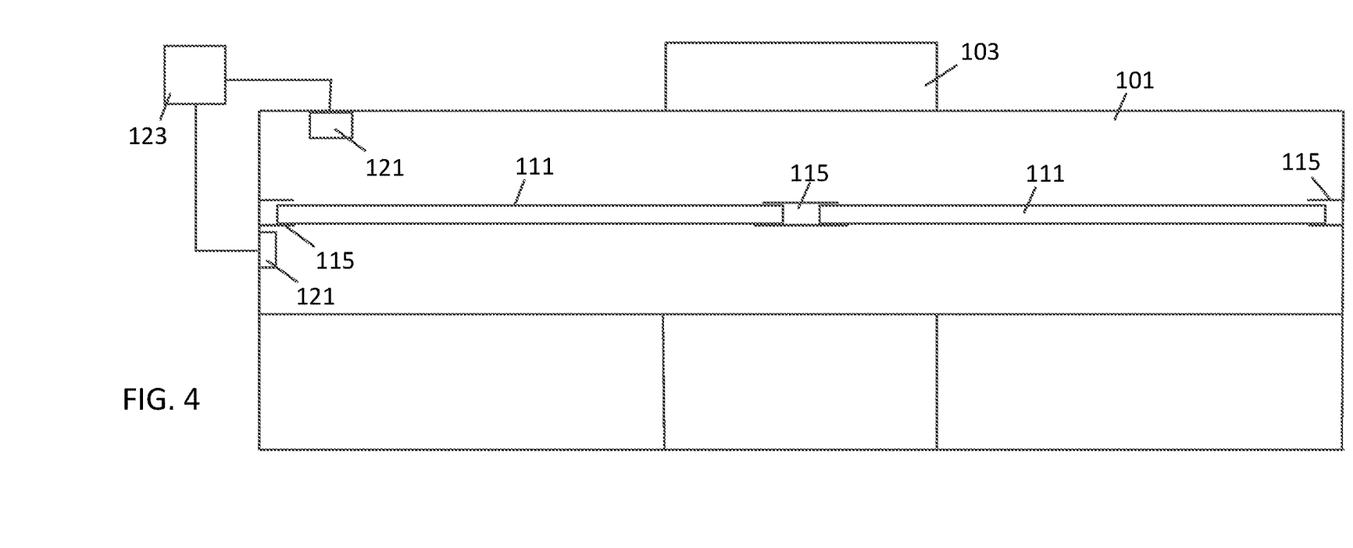
FIG. 4 illustrates a front section view of another embodiment of the air intake portion of the carbon dioxide distribution system.
Figure 5:
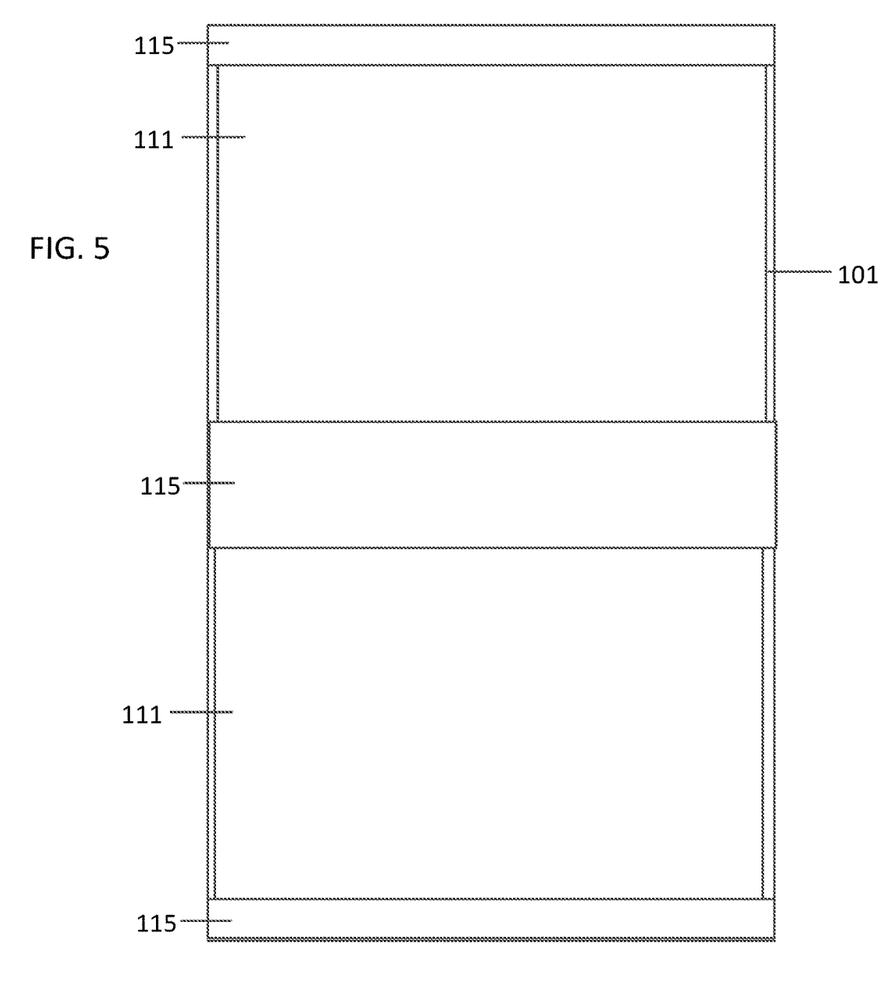
FIG. 5 illustrates a top section view of an embodiment of the air intake portion of the carbon dioxide distribution system.

With reference to FIG. 3, a cross section front view of an embodiment of the filter housing 101 is illustrated. In this embodiment, there are two filters 111 that are held in angled positions by channel brackets 115. With reference to FIG. 4, another cross section front view of an embodiment of the filter housing 101 is illustrated. In this embodiment, there are two filters 111 that are held in flat positions by the channel brackets 115. Air flows through the center portions of the filters 111 so the brackets 115 only contact the edges of the filters 111. In other embodiments, the filters 111 can be held by any other holding mechanisms. With reference to FIG. 5 a top sectional view of an embodiment of the filter housing 101 illustrated. A fan can be mounted within the intake collar 103 which can be attached to the air inlet on top of the filter housing 111. The fan can blow air into the filter housing 101 and through the filters 111.

With reference to FIGS. 3-5, the filters 111 can be mounted across the width of the filter housing 101 so that air from the inlet must flow through one of the filters 111. In this example, a first filter 111 is on one side of the filter housing 101 and a second filter 111 is on an opposite side of the filter housing 101. In an embodiment with reference to FIG. 3, the filters 111 can be angled rather than horizontally oriented within the filter housing. The edge of the filters 111 at the center of the filter housing 101 can be lower than the edges of the filters 111 at the outer sides of the filter housing 101. The filters 111 can be mounted on support structures which can be channel brackets 115 that extend across the length of the filter housing 101. In an embodiment, the support structures channel brackets 115 can have grooves that securely hold the inner and outer edges of the filters 111 in place within the filter housing 101. The filter housing 101 can have a hinged door that can be open to access the filters 111. The filters 111 can be removed and replaced when the hinged door is opened and the filters 111 can be locked in place within the filter housing 101 when the hinged door is closed.

The filters 111 can trap particulates from the plants, which can be beneficial when the plants being grown are very aromatic. Terpenes are a group of organic molecules derived from isoprene that are present in fruits, vegetables and vegetation. Terpenes are derived biosynthetically from units of isoprene and the basic molecular formula is ($C_5H_8$). These terpenes cause the specific odours for example: limonene in citrus fruit, pinene in pine tree. Marijuana is also a plant that produces terpenes. Because the smell of terpenes can be a nuisance to the surrounding areas, it can be highly beneficial to remove the marijuana terpenes that have been released into the air by the cannabis plants. In an embodiment, the filters used with the system can be terpene filters that remove terpenes from the circulating air in the plant grow building. By removing terpenes from the air, the odor generated by the building where the plants are grown can be greatly reduced so that the building is not a nuisance to the surrounding community. When the terpenes saturate the filters 111, the door to the filter housing 101 can be opened and the filters 111 can be removed and replaced with clean filters 111. The used filters 111 can be placed in sealed bags so that the odors are contained.

When the air enters the plenum through the fan 105, the air must passes through the air filters 111. In an embodiment, the filters 111 can have the dimensions, 12"×20"×1". This process disrupts the spiraling air flow created by the fan 105 and allows both sides of the supply runs to pressurize and distribute even amounts of air through the 1.125" duct exit holes. This was unachievable with a direct fan to supply run configuration. The process also eliminates the need for a separate fan and carbon filter to be installed in the room.

In an embodiment, a pressure sensor(s) 121 can be mounted in the filter housing 101 to measure static pressure and a differential pressure across the filters 111. This information can be used to determine the flow resistance through the filter 111 and the flow rate through the system. If a first pressure sensor 121 is mounted in the filter housing 101 upstream of the filter 111 and a second pressure sensor 121 is mounted in the filter housing 101 downstream of the filter 111, the differential pressure across the filters 111 can be measured. A clean filter 111 will allow air to more easily flow through the filter 111 and will have a lower differential pressure than a dirty filter 111. In an embodiment the system can have a processor 123 that is coupled to the pressure sensors 121 that monitor the differential pressure and the processor 123 can issue notifications when the differential pressure exceeds a predetermined value. The operator will then know that the filter(s) 111 need to replaced.

In another embodiment, the system sensor 121 and processor 123 can monitor the static pressure of the pressure up stream of the filter 111. This monitoring system can depend upon the air input providing a constant power or flow rate into the system. As the filter(s) 111 becomes dirty, the static pressure upstream of the filter(s) 111 will increase and when the upstream static pressure exceeds a predetermined value, the monitoring system can inform the operator who will then know that the filter(s) 111 need to replaced. Conversely, the system can monitor the static pressure of the pressure down stream of the filter(s) 111. As the filter(s) 111 becomes dirty, the static pressure downstream of the filter 111 will decrease and when the down stream static pressure falls below a predetermined value, the monitoring system can inform the operator who will then know that the filter(s) 111 need to replaced.

Figure 6:
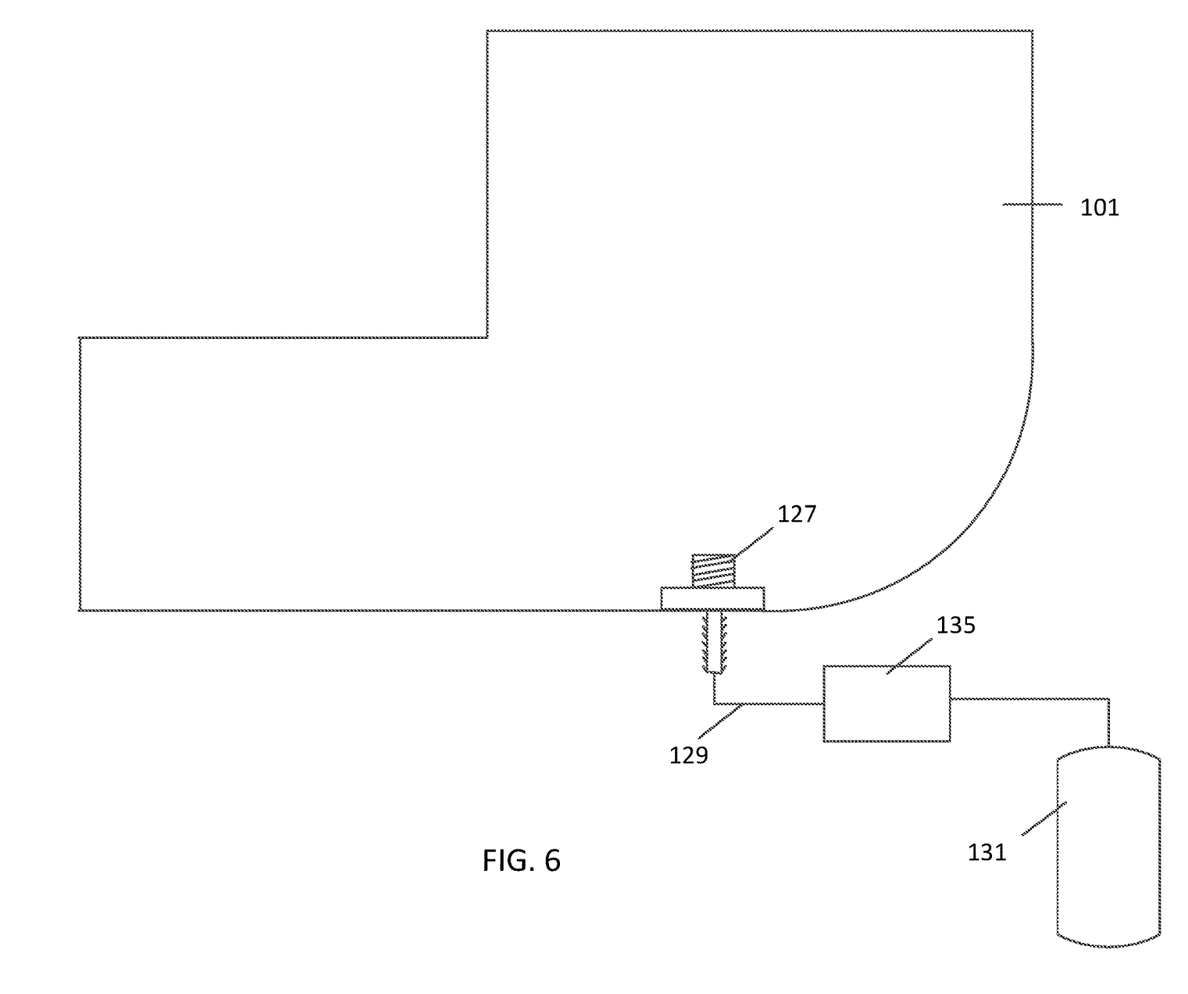
FIG. 6 illustrates a side section view of an embodiment of the air intake portion of the carbon dioxide distribution system.

With reference to FIG. 6, a side sectional view of the filter housing 101 is illustrated showing the carbon dioxide inlet 127 coupling attached to the bottom of the filter housing 101. The carbon dioxide inlet 127 in the illustrated example, can have a threaded insert which is bolted to the inner surface filter housing 101 which forms a seal with the filter housing 101 and prevents carbon dioxide gas leakage. An inlet coupling 127 extends from the filter housing 101. In an embodiment, the inlet coupling 127 can be a nipple which can be coupled to tubing 129 that can be used to deliver carbon dioxide to the filter housing 101. The carbon dioxide inlet coupling 127 can be coupled with tubing 129 to a carbon dioxide gas source 131 such as a carbon dioxide tank or other carbon dioxide supply. In an embodiment, a control valve 135 can be coupled between the carbon dioxide gas source 131 and the filter housing 101. The control valve 135 can be coupled to a carbon dioxide controller which can monitor the carbon dioxide levels in the building or at the plant levels. The carbon dioxide controller can maintain a predetermined carbon dioxide level by decreasing the carbon dioxide flow when the detected carbon dioxide level is too high and increase the carbon dioxide flow when the detected carbon dioxide level is too low.

Figure 7:
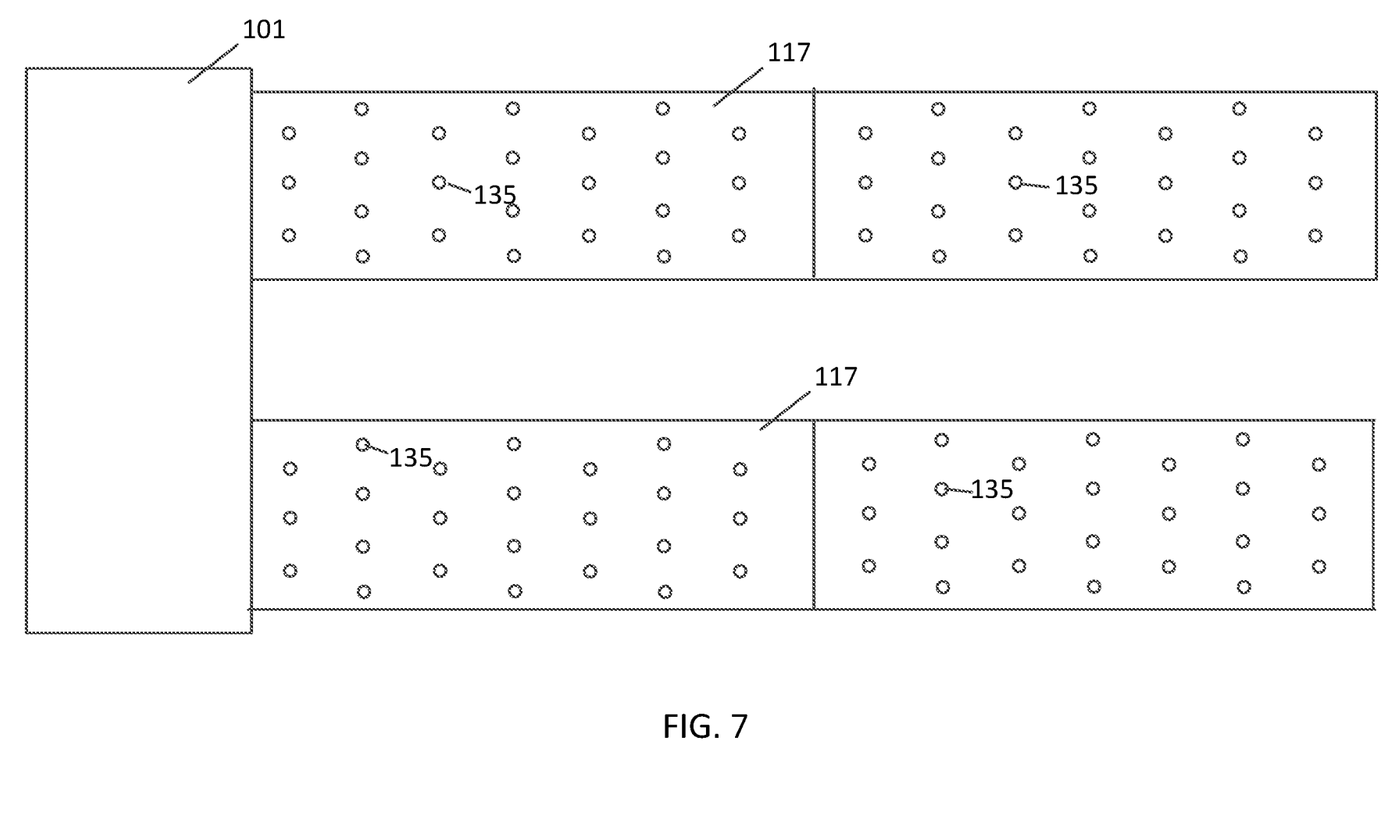
FIG. 7 illustrates a bottom view of an embodiment of the carbon dioxide distribution system.

With reference to FIG. 7, a bottom view of an embodiment of distribution ducts 117 of the carbon dioxide distribution system 100 is illustrated. Air and carbon dioxide flow through the ducts 117 from the proximal end attached to the filter housing 101 to the distal end of the ducts 117. The air and carbon dioxide will flow out of the holes 135 on the bottom of the ducts 117. In an embodiment, the holes 135 can be 1.125 inch diameter holes. However, in other embodiments, the holes 135 can be any suitable size such as 0.5 inch to 2.0 inch diameters.

The distribution ducts 117 can be a metal duct system made from aluminum or galvanized sheet metal. The distribution ducts 117 can be designed to be as thin as possible while still providing desired flow rate of carbon dioxide and velocity of air movement over a vertical gardening application. This can be accomplished by using a thin cross section distribution duct 117 so that the ducts consume very little vertical space. For example, the ducts 117 can have a cross section that is about 3 inches high and about 16 inches wide. This height to width (H/W) ratio can be known as the aspect ratio. In this example, the aspect ratio is 3/16=0.1875. In an embodiment, the aspect ratio of the ducts 117 is less than 0.25. The flow rate of the air and carbon dioxide can be quantified with a flow rate metric such as cubic feet per minute (CFM). The carbon dioxide and airflow eliminates warm pockets of air by providing concentrated air movement, carbon dioxide dispersion, and filtration.

Figure 8:
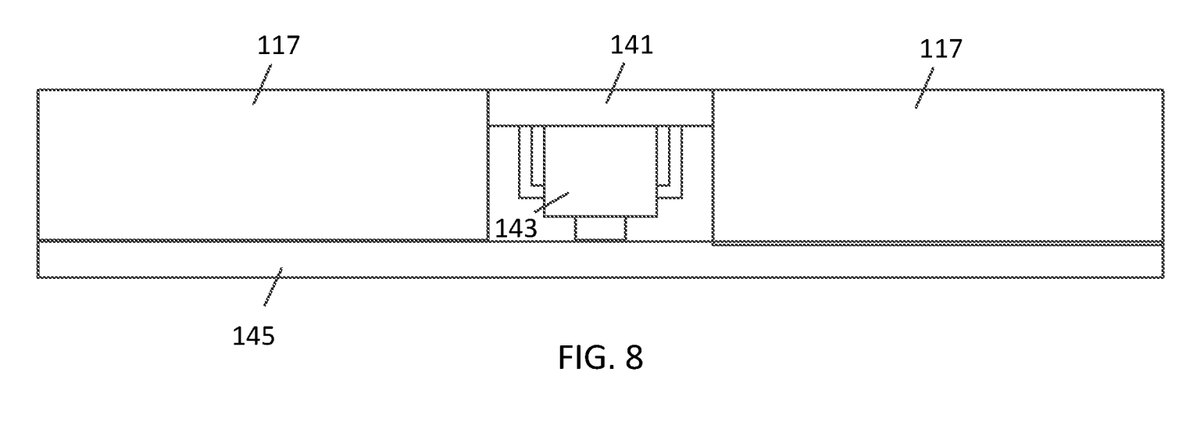
FIG. 8 illustrates a front view of an embodiment of the light ballast, light bar and carbon dioxide distribution ducts.

In addition to providing carbon dioxide to the plants on the rack system, embodiments of the present invention incorporate grow lights that emit light that is directed towards the plants. With reference to FIG. 8, a front view of an embodiment of the carbon dioxide distribution ducts 117 and grow light bar 145 used with the carbon dioxide distribution system 100 is illustrated. The grow light components can include a light ballast 143, a heat sink 141 and light bars 145 which hold a plurality of light emitting diodes (LEDs). Electrical power such as 110V AC or 220V AC is supplied to the light ballasts 143, which provide the required electrical power to the LED grow lights in the light bars 145. The ballasts 143 can limit the amount of current from supply line voltage, while maintaining the necessary electrical conditions for proper lamp start and operation. In this embodiment, the ballast 145 can be mounted under the lower surfaces of the air ducts 117. The ducts 117 can in physical contact with the light bars 145 and the ballasts 143. The ducts 117 can function as heat sinks for heat generated by the light bars 145 and the ballast 143. The ducts 117 can be dissipate the heat from the ballasts 143 and the light bars 145 to prevent over heating. Similarly, the heat sink 141 can help to dissipate the heat generated by the ballasts 143.

Figure 9:
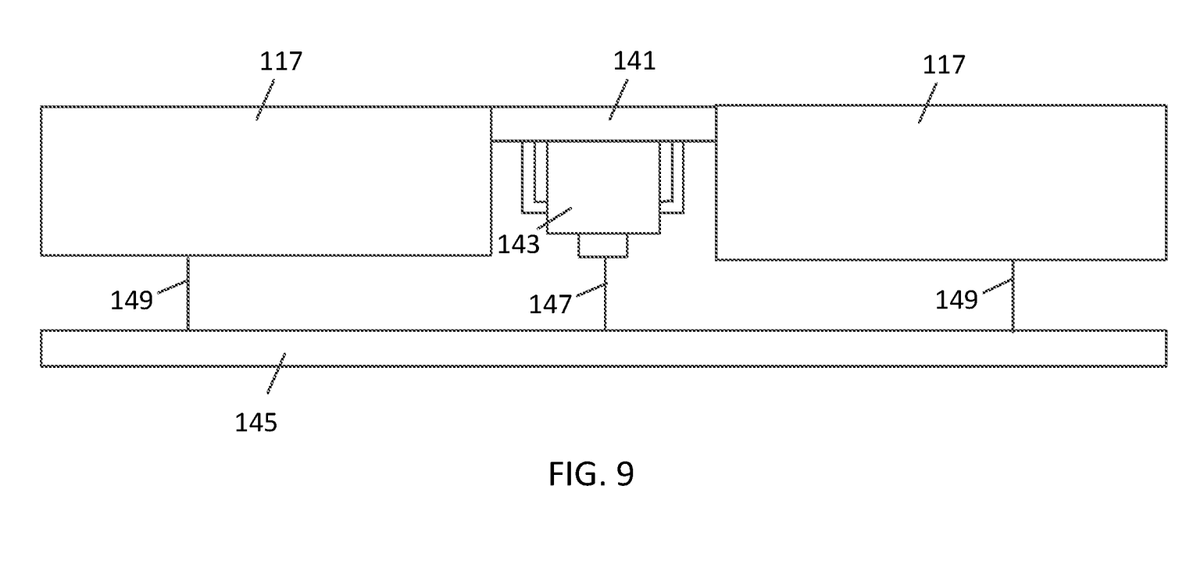
FIG. 9 illustrates a side view of a rack assembly having a carbon dioxide distribution system, a grow lights system and a carbon dioxide sensor system.

With reference to FIG. 9, a front view of another embodiment of the carbon dioxide distribution ducts 117 and grow lights 145 used with the carbon dioxide distribution system 100 is illustrated. In this embodiment, the light bar grow light bar 145 is supported by cables 149 which can be adjustable in length to adjust the height position of the light bar 145. The light bar 145 can be electrically coupled to the ballast 143 with an electrical cable 147.

Figure 10:
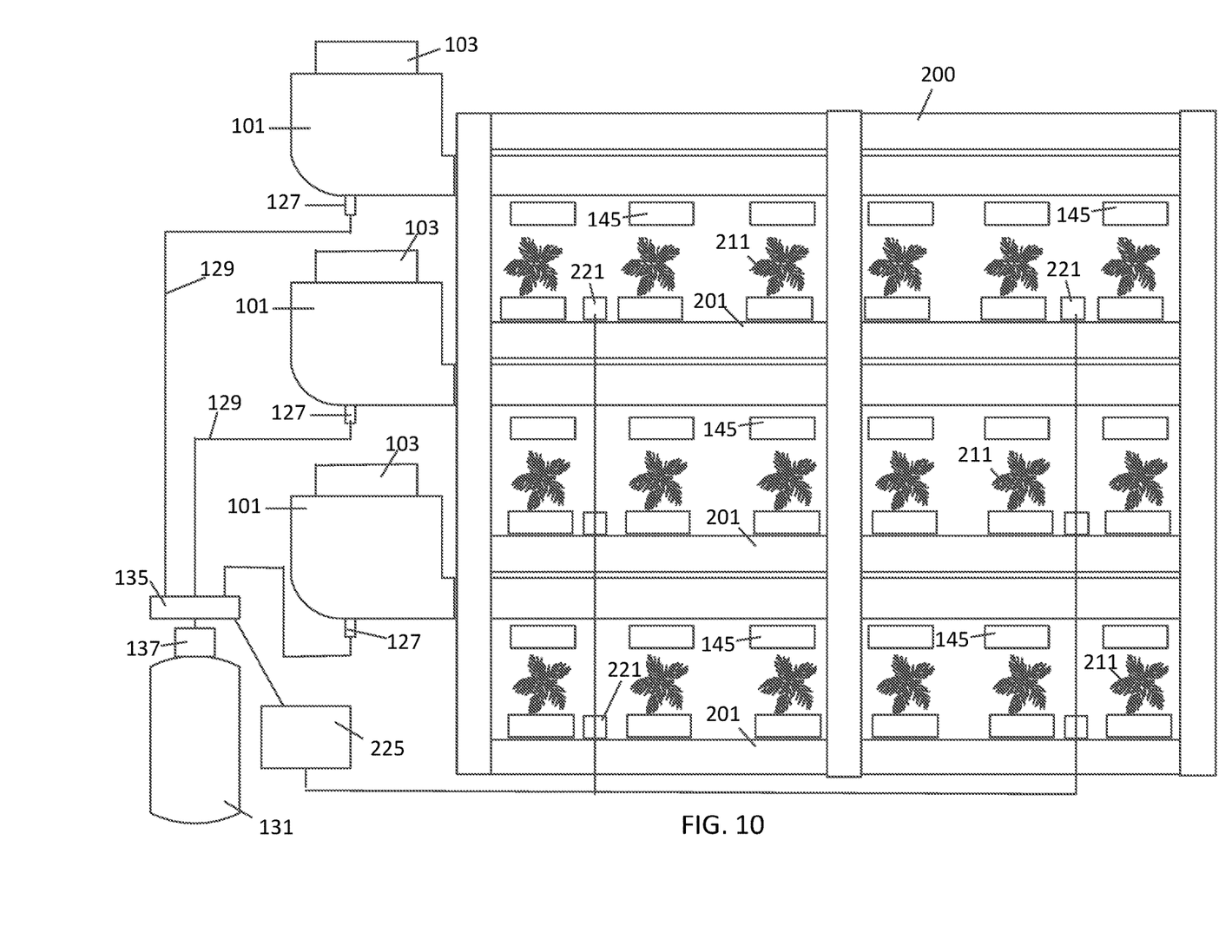
FIG. 10 illustrates a side view of an embodiment of a carbon dioxide distribution system on a rack system.

With reference to FIG. 10, the carbon dioxide distribution system can be used with a rack system 200 that includes a plurality of shelves 201 that provide a plurality of vertically aligned areas for growing plants 211. The ducts 117 of the carbon dioxide distribution systems can be mounted above each of the shelves 201 so that carbon dioxide can be delivered directly to the plants 211. The light bars 145 can also be mounted directly over the plants 211 so that exposure to the grow lights is maximized. An example of a pallet rack 200 is the PiPP mobile storage systems rack shelving system that has two basic components, beams and frames which are assembled to build racks with stacked shelves 201. http://www.pippmobile.com/Products/Shelving-Systems/Pallet-Rack.aspx The carbon dioxide system can be configured to maintain a specific level of carbon dioxide in a grow room. For example, in an embodiment, the system may be configured to maintain the carbon dioxide level at approximately 1,500 ppm. The system can include carbon dioxide sensors 221 coupled to a controller 225 that controls flow control values 135 coupled to the carbon dioxide source 131. By altering the positions of the control valves 135, the flow rates of carbon dioxide to the carbon dioxide distribution systems can be adjusted. The controller 225 can control the flow rate to maintain an optimum carbon dioxide level and prevent the carbon dioxide level from becoming dangerous. When the carbon dioxide level is too high (for example, above, 2,000 ppm), the sensors 221 can detect this excess carbon dioxide and reduce the flow rate of carbon dioxide into the distribution system. Conversely, if the carbon dioxide level is detected as being lower than 1,000 ppm, the controller 225 can open the control vales 135 to increase the carbon dioxide levels through the carbon dioxide distribution system. If the carbon dioxide source 131 is tanks a pressure sensor 137 can be mounted to the tank. If the pressure in the tank drops below a predetermined level, the system can inform the operator that the carbon dioxide tank should be replaced.

If the carbon dioxide level exceeds a level of 3,000, the system can issue a warning indicating that there can be a carbon dioxide control problem and the control system should be inspected. If the carbon dioxide level exceeds a level of 5,000, the system can issue a warning indicating that the carbon dioxide level exceeds the workplace exposure limit and warning people not to enter the room. With reference to Table 1 below a listing of carbon dioxide levels and the human reaction to exposure to the carbon dioxide gas.

TABLE 1

| Carbon Dioxide level | |
|---|---|
| 250-350 ppm | Normal carbon dioxide level in outdoor ambient air |
| 250-1,000 ppm | Normal carbon dioxide level in indoor air |
| 1,000-2,000 ppm | Poor quality air and complaints of drowsiness |
| 2,000-5,000 ppm | Headaches and sleepiness, increased heart rate and nausea. |
| 5,000+ ppm | Exceeds workplace exposure limit |

The ducts 117 can run along the length of the rack shelves 201 and the light bars 145 can extend across the width of the shelves 201. In this embodiment, the light bars 145 can be suspended with wires or other supports below the ducts. In other embodiments, the light bars 145 can be mounted directly to the bottom of the ducts 117. In an embodiment, the height of the light bars 145 over the plants 211 can be adjustable. The light bars 145 can be positioned so that the LED lights may be 12-18 inches above the plants 221. As the plants 211 grow, the vertical positions of the light bars 145 may be adjusted to provide the optimum grow light exposure to the plants 211.

The present disclosure, in various embodiments, includes components, methods, processes, systems and/or apparatus substantially as depicted and described herein, including various embodiments, subcombinations, and subsets 
thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the flowing claims reflect, inventive aspects lie in less than all features of any single foregoing disclosed embodiment.

What is claimed is:

1. An apparatus for dispersing carbon dioxide gas comprising:
   a fan coupled to an air inlet portion of a filter housing, where the filter housing is positioned below the fan;
   a first elongated duct having a first plurality of holes on a lower surface of the first elongated duct and the first elongated duct is coupled to an outlet portion of the filter housing;
   a filter between the air inlet portion and the outlet portion of the filter housing; and
   a carbon dioxide input coupled to the outlet portion of the filter housing for introducing carbon dioxide;
   wherein the fan directs ambient air in a downward direction and into the filter housing and through the filter and filtered air mixed with the carbon dioxide flows away from the filter housing in a horizontal direction through the first elongated duct and through the plurality of holes in the first elongated duct.

2. The apparatus of claim 1 wherein the elongated duct has a rectangular cross section that has a width that is greater than a height of the elongated duct.

3. The apparatus of claim 1 wherein the plurality of holes have an inner diameter between 0.5 and 2 inches in diameter.

4. The apparatus of claim 1 wherein the plurality of holes form a pattern on the lower surface of the elongated duct with between 10 and 100 holes per square foot of the lower surface of the elongated duct.

5. The apparatus of claim 1 further comprising:
   a second elongated duct having a second plurality of holes on a lower surface of the second elongated duct and the second elongated duct is coupled to an outlet portion of the filter housing.

6. The apparatus of claim 1 wherein the ambient air is mixed with carbon dioxide at a ratio of 0.0015 $m^3$ of the carbon dioxide for every 1 $m^3$ of the ambient air.

7. The apparatus of claim 1 further comprising:
   a light ballast coupled to a lower surface of the filter housing; and
   a light bar having a plurality of light emitting diodes, the light bar mounted under the first elongated duct.

8. The apparatus of claim 1 further comprising:
   a light ballast coupled to a lower surface of the filter housing; and
   a light bar having a plurality of light emitting diodes, the light bar electrically coupled to the light ballast and the light bar mounted under the first elongated duct.

9. The apparatus of claim 1 wherein the filter is a terpene filter which removes terpene particles from the ambient air passing through the filter.

10. An apparatus for dispersing carbon dioxide gas comprising:

a plurality of shelves configured in a vertical rack, each of the plurality of shelves having a carbon dioxide dispersing system comprising:

an air inlet portion of a filter housing;

a first elongated duct having a first plurality of holes on a lower surface of the first elongated duct and the first elongated duct is coupled to an outlet portion of the filter housing;

a filter between the air inlet portion and the outlet portion of the filter housing;

a carbon dioxide input coupled to the outlet portion of the filter housing for introducing carbon dioxide; and a fan positioned above the filter housing and which directs ambient air in a downward direction into the filter housing and through the filter and filtered air mixed with the carbon dioxide flows away from the filter housing in a horizontal direction through the first elongated duct and through the plurality of holes in the first elongated duct.

11. The apparatus of claim 10 wherein the elongated duct has a rectangular cross section that has a width that is greater than a height of the elongated duct.

12. The apparatus of claim 10 wherein the plurality of holes have an inner diameter between 0.5 and 2.0 inches.

13. The apparatus of claim 10 wherein the plurality of holes form a pattern on the lower surface of the elongated duct with between 10 and 100 holes per square foot of the lower surface of the elongated duct.

14. The apparatus of claim 10 the carbon dioxide dispersing system further comprises:

a second elongated duct having a second plurality of holes on a lower surface of the second elongated duct and the second elongated duct is coupled to an outlet portion of the filter housing.

15. The apparatus of claim 10 wherein ambient air is mixed with carbon dioxide at a ratio of 0.0015 $m^3$ of the carbon dioxide for every 1 $m^3$ of the ambient air.

16. The apparatus of claim 10 further comprising:

a light ballast coupled to a lower surface of the filter housing; and a light bar having a plurality of light emitting diodes, the light bar mounted under the first elongated duct.

17. The apparatus of claim 10 further comprising:

a light ballast coupled to a lower surface of the filter housing; and a light bar having a plurality of light emitting diodes, the light bar electrically coupled to the light ballast and the light bar mounted under the first elongated duct.

18. The apparatus of claim 10 wherein the filter is a terpene filter which removes terpene particles from the ambient air passing through the filter.

* * * * *

UNITED STATES PATENT AND TRADEMARK OFFICE
CERTIFICATE OF CORRECTION

PATENT NO. : 10,694,682 B2  
APPLICATION NO. : 15/730659  
DATED : June 30, 2020  
INVENTOR(S) : Matthew L. Bogner and James A. Cunningham

Page 1 of 1

It is certified that error appears in the above-identified patent and that said Letters Patent is hereby corrected as shown below:

On the Title Page

Item (72) correct inventor James Cunningham's middle initial from "C." to --A.--.

Signed and Sealed this
Twenty-fifth Day of August, 2020

Andrei Iancu
*Director of the United States Patent and Trademark Office*